E. BROWN.
FLUID OPERATED TURBINE.
APPLICATION FILED JUNE 25, 1910.
986,902.
Patented Mar. 14, 1911.
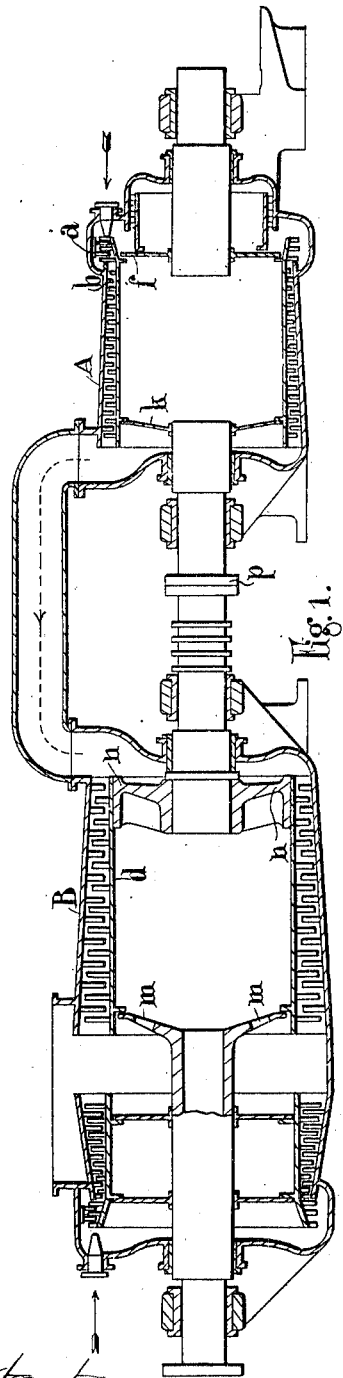
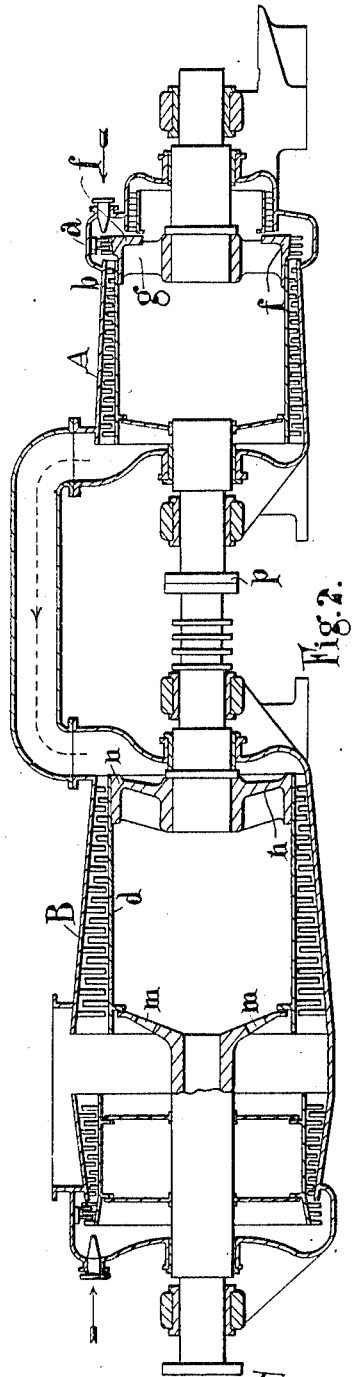

UNITED STATES PATENT OFFICE.

ERIC BROWN, OF BADEN, SWITZERLAND.

FLUID-OPERATED TURBINE.

986,902.  Specification of Letters Patent.  Patented Mar. 14, 1911.

Application filed June 25, 1910. Serial No. 568,837.

*To all whom it may concern:*

Be it known that I, ERIC BROWN, a subject of the King of Great Britain and Ireland, residing at Bahnhofweg, Baden, Switzerland, have invented certain new and useful Improvements in Fluid-Operated Turbines, of which the following is a specification.

This invention relates to a turbine arrangement of the type in which a reaction turbine is divided up into two separate elements which are placed in series on the working fluid and connected together by a rigid shaft coupling. In such an arrangement the balancing of the two elements is obtained by providing at the adjacent ends of the two turbine rotors two surfaces, one for each rotor both of the same area and subjected to the same fluid pressure. Since the thrusts due to the fluid pressure on the two balancing surfaces act in opposite directions they neutralize one another so that the balancing is unaffected by dividing up said reaction turbine into two elements, while the fluid thrust in the reaction part of both turbine elements balances the end propeller thrust.

The object of the present invention is to provide a turbine arrangement of the above type which shall be exactly balanced throughout a very large range of varying pressure of the working fluid.

For this purpose the invention consists in providing at the fluid inlet end of the high pressure reaction turbine element an impulse stage, the loss of end thrust due to the use of which is compensated for by an additional balancing surface placed at the end of the rotor of the said reaction stage and subjected to the pressure of the fluid in the impulse stage, while the fluid thrusts in both turbine elements act jointly to balance the propeller thrust.

The invention further consists in the arrangement of fluid turbines as hereinafter described with reference to the accompanying drawings.

Referring now to the accompanying drawing:—Figure 1 shows diagrammatically a cross sectional view of the installation and Fig. 2 shows a method of connecting the impulse stage and balancing surface to form the end of the rotor of the succeeding reaction turbine.

In carrying the invention into effect according to the arrangement shown in Fig. 1 the high pressure turbine element A is connected by a shaft coupling, $p$, to the low pressure element B, the elements A and B being connected in series by a connection such as an external pipe or a passageway within the casing of the two elements, the dotted lines indicating the direction of flow from one element to the other.

The ends of the rotors of the two reaction turbine parts $b$ and $d$ are provided at their adjacent ends with balancing surfaces $k$ and $n$ which are equal in area. These balancing surfaces are placed in, or connected to the passage through which the working fluid passes from one element to the other and are therefore subjected to the same pressure which causes equal thrusts in opposite directions, these thrusts therefore neutralizing one another.

In order to allow of a greater range of fluid pressure being possible with economy and exact balancing the reaction part $b$ of the high pressure element A is preceded by an impulse or action stage $a$, having a variable number of expansion nozzles. Since there is practically no axial thrust in the impulse stage $a$ capable of being utilized to balance the propeller thrust and the thrust in the reaction part $b$ has also been considerably diminished it is necessary to provide an additional balancing surface. This balancing surface $f$ is preferably placed at the end of the rotor of the reaction part $b$ adjacent to the impulse stage $a$ and is subjected to the pressure of the working fluid in the impulse stage $a$. The balancing surface $f$ thus arranged may be of a relatively small area and advantageously dispenses with the use of a dummy piston and its rotary packing, since the force of the fluid pressure acting on the surface $f$, together with the thrust in the reaction parts $b$ and $d$ now completely balances the propeller thrust.

The provision of a balancing surface in the high pressure element as well as in the low pressure element allows of balancing the propeller thrust under widely varying loads while the utilization of the front end of the high pressure reaction turbine rotor dispenses with the use of a dummy piston. Further, since only one impulse stage $a$ is used in the present installation it is possible to adopt a rotor drum of rigid construction. Such a construction is shown in Fig. 2 in which the balancing surface $f$ is formed in a detachable member $g$, which itself forms the end of the rotor of the reaction turbine $b$, and at the same time carries the impulse stage $a$.

It will be seen that the rigid coupling $p$, between the high pressure and low pressure elements A and B respectively allows (since the balancing surfaces in the two elements act jointly when balancing the propeller axial thrust) of distributing the expansion stages of the working fluid over the separate high pressure and low pressure elements in any suitable proportion. Thus if the balancing surface in the element B prove to be rather small the balancing surface in the high pressure element A can be made correspondingly larger or vice versa.

Having now described my invention what I claim as new and desire to secure by Letters Patent is:—

1. In an elastic fluid operated turbine plant having a high pressure and a low pressure element both of the reaction type on the same line of shafting, a rigid shaft connection between said elements, a rotor in each of said elements, a balancing surface on each of the two adjacent ends of said rotors, each surface being of the same area and subjected to the same fluid pressure, an impulse stage placed in front of said high pressure reaction element, expansion nozzles therefor, a balancing surface placed at the inlet to said reaction element and subjected to the pressure of the fluid in the impulse stage, whereby said high pressure and low pressure element always balance exactly the propeller thrust under a variable load.

2. An elastic fluid operated turbine plant having a high pressure and a low pressure element on the same line of shafting, a rigid coupling between said elements a rotor in each of said elements, a balancing surface at the adjacent ends of said rotors each surface being of the same area, and an impulse stage placed in front of said high pressure element, nozzles admitting working fluid to said impulse stage and means whereby the turbine elements are balanced with any number of nozzles open, a member carrying said balancing means and impulse stage and at the same time forming the end of the high pressure element.

3. In an elastic fluid operated turbine plant having a high pressure and a low pressure element both of the reaction type on the same line of shafting, a rigid shaft connection between said elements, a rotor in each of said elements, a balancing surface on each of the two adjacent ends of said rotors, each surface being of the same area and subjected to the same fluid pressure an impulse stage placed in front of said high pressure reaction element expansion nozzles therefor, a balancing surface placed at the inlet to said reaction element and subjected to the pressure of the fluid in the impulse stage, a member forming the end for the rotor of the high pressure reaction turbine element and at the same time carrying said impulse stage and balancing surface whereby said high pressure and low pressure elements always balance exactly the propeller thrust under a variable load.

In testimony whereof, I affix my signature in presence of two witnesses.

ERIC BROWN.

Witnesses:
C. TEYTTEKEIN,
F. GORRI.

Copies of this patent may be obtained for five cents each, by addressing the "Commissioner of Patents, Washington, D. C."